Feb. 14, 1956  R. CLARET  2,734,269
ANGULAR POSITION DATA APPARATUS
Filed Aug. 11, 1952  7 Sheets-Sheet 6

Fig. 6

Inventor
Rene Claret
By Pennie Edmonds Morton Barrows & Taylor
attys

Fig. 7

United States Patent Office 2,734,269
Patented Feb. 14, 1956

2,734,269

ANGULAR POSITION DATA APPARATUS

Rene Claret, Sceaux, France, assignor to Office National d'Etudes et de Recherches Aeronautiques, Chatillon sous Bagneux, France, a company of France Application August 11, 1952, Serial No. 303,778

Claims priority, application France August 11, 1951

2 Claims. (Cl. 33—1)

This invention relates to angular position measuring systems and more particularly to an instrument for automatically following a direction indicated by a spot of light, such as a star, and for accurately reading the direction of the line of sight from the instrument to the spot of light with respect to a frame of reference in which the instrument is mounted. With the instrument of the invention the angles specifying the orientation of such a line of sight may be read to an accuracy of the order of a few seconds of arc. By means of appropriate apparatus for the establishment of the spot of light as a representation of a desired directional quantity, the invention may be used to continuously measure the angular inclination of any space vector (represented by the spot of light) with respect to a frame of reference.

According to the invention, an image-forming optical instrument is provided in rigid coaxial rotation with an image tube of the iconoscope type, the common axis of these elements being hereinafter referred to as the axis of the instrument. The instrument is mounted on a base for independent rotations about two axes, preferably perpendicular, and means such as appropriate servo-mechanisms are provided whose purpose is to constrain the instrument to maintain its axis pointed at a moveable spot of light. Thus the instrument can within limits imposed by its mounting, be orientated with its axis in any desired direction in 3-space. The optical component of the instrument of the invention forms from the moving spot of light a small or point-shaped light image, and the electron image tube forms from this optical image a small or point-shaped electron image. In view of the time constant of the servo-system which adjusts the orientation of the instrument in its frame of reference (i. e. with respect to its base), and by virtue of inherent imperfections of construction, the optical axis of the instrument will not in general coincide with the line of sight to the spot of light such as a star being tracked, and in consequence the electron image in the image tube will not be located on the axis of the instrument. These error angles, i. e. the inclination of the true line of sight to the instrument axis, as resolved into appropriate components, must be added to the angles indicating the orientation of the instrument with respect to its base in order to obtain the true direction of the line of sight with respect to that base.

It is an object of the present invention to provide means for the measurement of the variable angles formed between the frame of reference and the true direction to the spot of light being tracked, independently of the time constant of the servo-system which adjusts the orientation of the axis of the instrument.

It is another object of the present invention to provide means for the measurement of the variable angles formed between the frame of reference and the true direction which will give separately and simultaneously the angles between frame of reference and the axis of the instrument on the one hand, and the angles between the axis of the instrument and the true direction to the spot of light on the other hand.

It is another object of the present invention to provide electronic means for measuring the coordinates of an electron image formed on the target or electron image storage surface of the image tube. The axes of these coordinates may be selected as two perpendicular axes passing through the center of the target (which center is on the axis of the instrument), defined by the traces in the target surface of planes containing the axis of the instrument and one or the other of the mechanical axes of rotation of the instrument with respect to its framed reference, i. e. its base.

It is another object of the present invention to provide means to determine from these coordinates the values of the projections, on the planes containing these rectangular axes and the axis of the instrument, of the angle between the line of sight from the instrument to the spot of light and the axis of the instrument, having regard to the focal distances of the optical component of the instrument and of the electron image tube and to the magnification produced by the latter.

Other objects and characteristics of the invention will be understood from a consideration of the following detailed description which is to be taken in connection with the annexed drawings in which.

Figure 1:
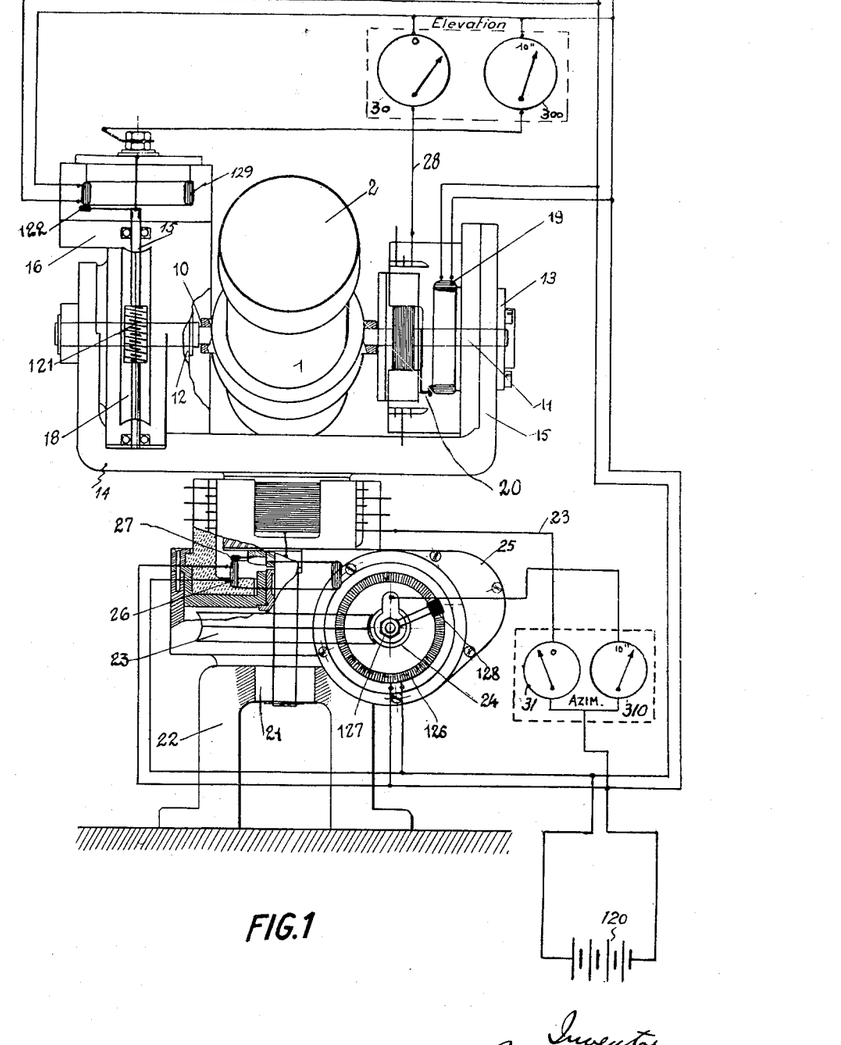
Fig. 1 is a view in front elevation of one embodiment of the instrument of the invention including a telescope and electron image tube, certain elements of associated apparatus being schematically indicated.
Figure 2:
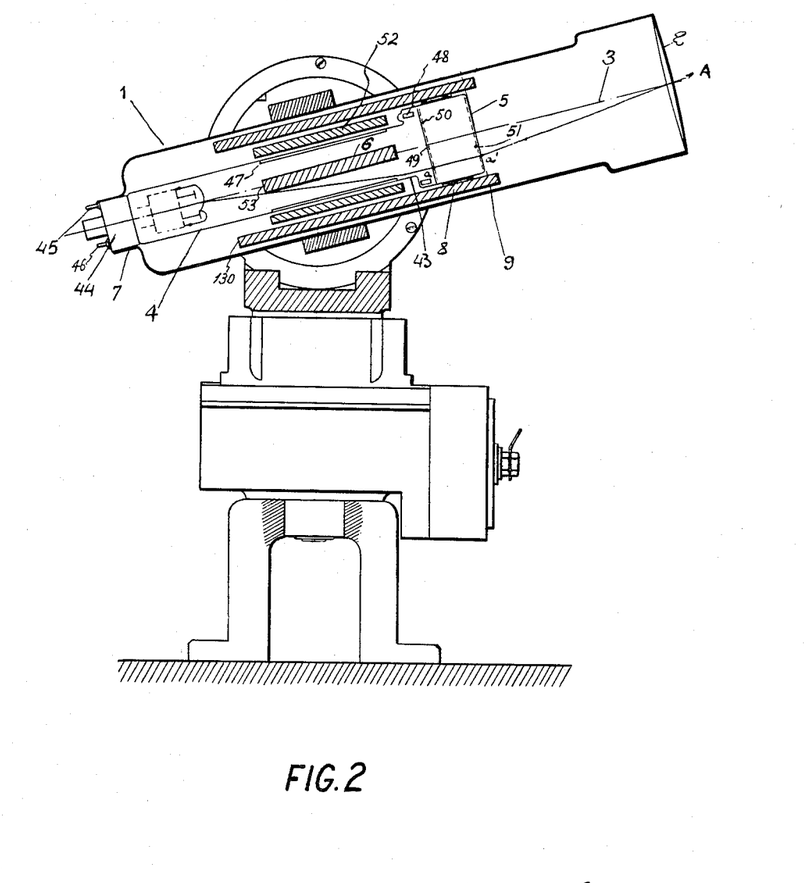
Fig. 2 is a sectional view in side elevation of the telescope and image tube of the instrument of Fig. 1.

Referring to Figs. 1 and 2, 1 represents the tube of a telescope including both optical and electronic components. The optical component of the telescope 1 comprises an objective 2 whose optical axis 3 (Fig. 2) coincides with the axis of the telescope tube 1. The electronic component comprises essentially an electron image tube 4 of the image orthicon type. The photo-electrically sensitive surface 5 of the tube 4 is located in the focal plane 9 of the telescope and the tube 4 is so fastened in the telescope tube 1 by means of supporting rings 7 and and 8 that its axis of symmetry 6 coincides with the optical axis 3 of the objective 2.

The telescope tube 1 is provided with trunnions 10 and 11 (Fig. 2) which turn in bearings 12 and 13 of a fork 14. On one arm of fork 14 there is mounted a servo-motor 16 whose shaft 15 carries a worm 121 engaging the worm wheel 18 affixed to the trunnion 10. To the other arm of the fork there is affixed a circular potentiometer 19 having a very fine winding. The potentiometer is engaged by a contact brush 20 affixed to the trunnion 11.

The fork 14 is rotatable about a vertical axis in the bearing 21 which is fixed to a base 22. A worm wheel 23 affixed to the fork coaxially of bearing 21 engages a worm 24 on the shaft of a servo-motor 25 supported in the base. A further circular potentiometer 26 having a fine winding is affixed to the base 22 coaxially of the axis of rotation of the fork 13, and a brush 27 fastened to the fork engages the potentiometer 26. The potentiometers 19 and 26 are energized from a battery 120. The brushes 20 and 27 are respectively connected by lines 28 and 29 to the voltmeters 30 and 31 which therefore indicate the elevation and azimuth angles of the telescope with respect to base 22, with a precision of the order of 1°, for example.

The worm wheels 18 and 23 should be free from backlash in engagement with their worms, and may advantageously be of the split type whose two halves are stressed into relative rotation by means of springs.

It is desirable to provide between the worms 121 and 24 and the worm wheels 18 and 23, a drive free from backlash because the accuracy of the angular readings obtainable from the potentiometers 19 and 26 directly is generally inferior to that to be achieved by the invention which as hereinbefore stated is of the order of a few seconds of arc. In order to obtain the desired precision, the voltages read on the potentiometers 19 and 26 are analyzed by means of potentiometers 129 and 126 which are respectively fastened to the worms 121 and 24 coaxially of their shafts 15 and 127. The drive ratio of the worm and worm wheel drives is chosen to provide the desired degree of precision in the readings of potentiometers 129 and 126. If this precision is unobtainable in a single worm-worm wheel stage a second stage may be employed and two supplementary potentiometers may be positioned on the shafts of the first worms. This will of course be appropriate only if the play introduced by the added mechanical elements remains below the order of accuracy desired.

The potentiometers 129 and 126 are also energized from the battery 120. The brush 122 on potentiometer 129 is connected to the voltmeter 300 and provides the complement to the order of 10 seconds of arc for example, to the elevation angle read to one degree of accuracy on the voltmeter 30.

Similarly brush 128 of potentiometer 126 is connected to voltmeter 310 and gives the complement of the azimuth angle read on the voltmeter 31.

Together voltmeters 30, 300, 31, and 310 make it possible to read to an accuracy of some 10 seconds of arc the elevation and azimuth angles of the optical axis 3 of the instrument with respect to a frame of reference fixed with respect to the base 21.

Figure 3:
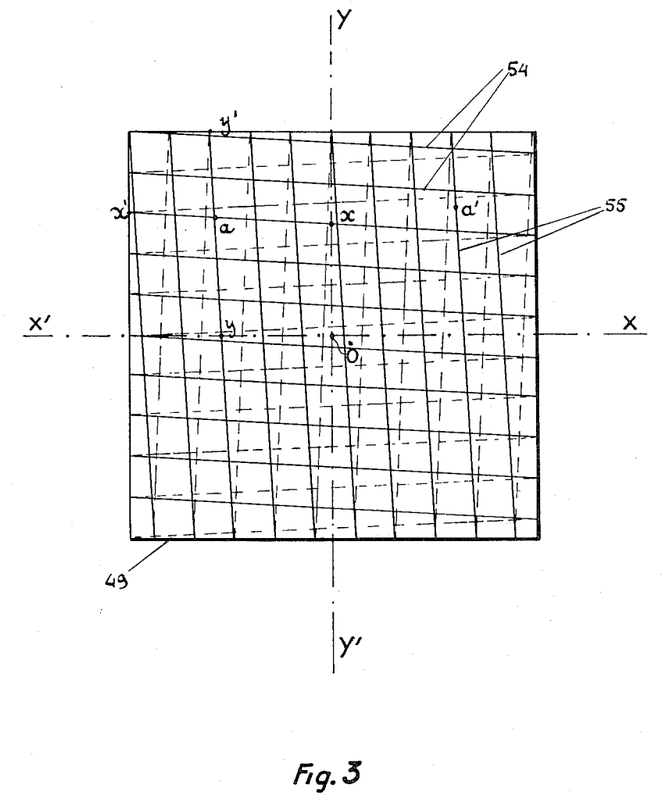
Fig. 3 is a diagram of the target area of the image tube, showing (with exaggerated spacing between the lines thereof) horizontal and vertical scanning patterns.
Figure 4:
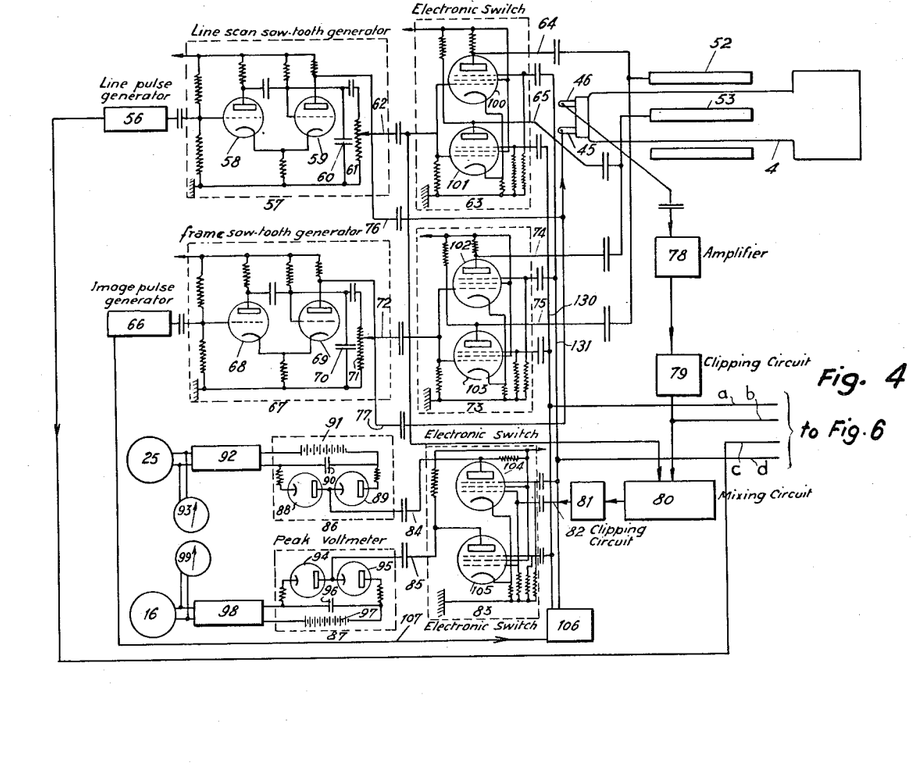
Fig. 4 is a schematic diagram of an electron tube circuit associated with the image tube for continuous development of the coordinates of the electron image on the target of the image tube.

The image orthicon tube 4 and the associated electrical circuits are shown in Figs. 2 and 4 and the photo-sensitive surface of the tube is shown in Fig. 3.

The tube 4 includes a glass envelope 43, a base, contact pins collectively designated 44, a metallic anode coating 47, a decelerating electrode 48, a target 49 supported on a fine mesh screen 50, a photo-electrically sensitive surface 51, a horizontal deflection coil 52, a vertical deflection coil 53, and a focusing coil 130 for the scanning beam and for the formation of the electron image on the target 49. The control grid of the tube is connected to contact pin 45, and the output electrode of a built-in electron multiplier section is connected to contact pin 46.

The optical image of the object "A" (such as a distant star) observed with the telescope is formed at $a'$ on the photo-sensitive surface 51 and gives rise to an electron image at $a$ on the mosaic target 49. See Fig. 2.

The target is scanned by the electron beam over successively horizontal lines 54 and vertical lines 55. The beam is produced in a suitable electron gun at the base of the tube. The lines of scanning are shown in Fig. 3 at an exaggerated obliquity and separation from each other. The scanning is carried out in a fashion somewhat similar to that employed in television, and the circuits which will now be described make it possible to obtain voltages which are respectively proportional to the abscissa $ax$ and to the ordinate $ay$ of the electron image $a$, with respect to XX' and YY' axes of coordinates passing through the center of the target and parallel to its edges. These voltages are derived from voltages respectively proportional to the abscissa $ax'$ and the ordinate $ay'$ of the same electron image with respect to coordinate axes parallel to those previously mentioned but passing through the upper left hand corner of the target as seen in Fig. 3 from the objective end of the telescope.

Figure 5:
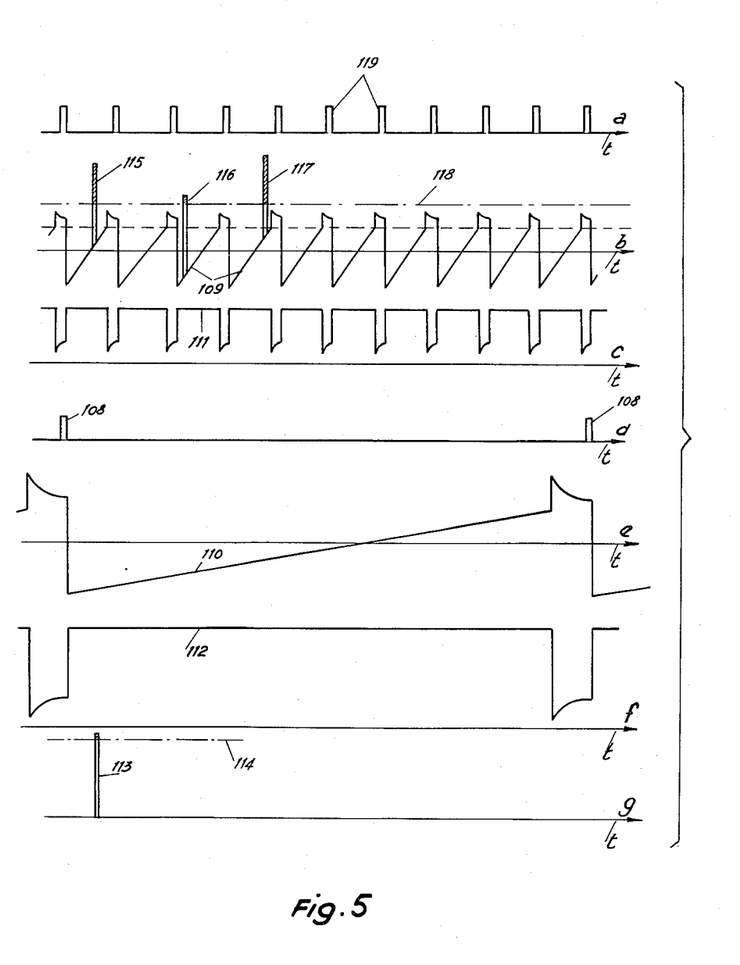
Fig. 5 is a diagram illustrating in idealized form the wave forms of signals at certain points in the circuit of Fig. 4.

Referring to Figs. 4 and 5, 56 is a line synchronizing pulse generator whose positive polarity pulses 119 are illustrated at wave form $a$ of Fig. 5. In these wave forms, the horizontal axis of coordinates represents time, increasing toward the right.

Pulses 119 are applied to a sawtooth voltage generator 57 taking the form of a multivibrator comprising two tubes 58 and 59 having their cathodes coupled together and a discharge condenser inserted into the plate-cathode circuit of tube 58. The relaxation frequency of the multivibrator 57 is chosen slightly below the recurrence frequency of the trigger pulses 119. The voltage across the condenser 60 is applied via the voltage divider 61 and a line 62 to the input of an electronic switch 63 whose two outputs 64 and 65 are respectively connected to the horizontal and vertical deflection windings 52 and 53 of the image tube 4.

66 is a frame synchronizing pulse generator whose pulses 108 are illustrated at wave form $d$ of Fig. 5. The pulses 108 are applied to a sawtooth generator 67 similar to generator 57 but having a natural frequency slightly below the repetition frequency of the frame pulses 108. The generator 67 comprises tubes 68 and 69 and condenser 70. The voltage across the condenser 70 is applied via a voltage divider 71 and line 72 to the input of an electronic switch 73 whose outputs 74 and 75 are respectively connected to the vertical and horizontal deflection windings 53 and 52 of the image tube 4.

The sawtooth line scanning voltages are shown at 109 on wave form $b$ of Fig. 5 and the sawtooth frame scanning voltages are shown at 110 of wave form $e$. Wave forms $c$ and $f$ of Fig. 5 further show the voltage wave forms on the plates of tubes 59 and 69. These signals comprise rectangular pulses 111 and 112 of large amplitude during the existence of the sawteeth 109 and 110 and of small amplitude during the interval between successive sawteeth. The signals of wave forms $c$ and $f$ are applied via lines 76 and 77 to the intensity modulation grid of the tube 4 at its contact pin 45, whereby the electron beam is suppressed during the line and frame retrace periods.

The output signal pin 46 of tube 4 is connected to an amplifier 78 and delivers to this amplifier a video signal comprising a pulse of video frequency appearing at the point of time when the electron beam passes over the electronic image $a$. This pulse is illustrated at 113 on wave form $g$ of Fig. 5. Inasmuch as its amplitude depends on the brilliance of the optical image $a'$ it is clipped at the level 114 in the clipping stage 79 disposed at the output end of the amplifier 78.

The pulse 113 occurs between two successive line synchronizing pulses 119. In order to obtain a voltage proportional to the time interval separating the video pulse 113 and the immediately preceding line pulse one may use a circuit similar to that employed in multiplex pulse modulated signaling systems for the transformation of time modulation into amplitude modulation.

The sawtooth line scanning voltages 109 and the video pulses 13 are mixed in a mixing stage 80 which is followed by a clipper 81. At the output of the mixer there appears a pulse superimposed on a sawtooth as indicated at 115, 116, and 117 in wave form $b$ in Fig. 5. These three cases correspond respectively to video pulses occurring at the middle, at the beginning, and at the end of a line scanning voltage wave 109. The pulses 115 to 117 are clipped at the level 118 in clipper 81 and the amplitude of the cross-hatched portions retained is proportional to the time interval between the beginning of the sawtooth and the appearance of the video pulse. It is to be understood of course that pulses 115, 116, and 117 do not represent three successive video pulses which would actually be delivered by the tube 4, since the speed of scanning is much higher than any motion of the electron image over the target.

The output of the clipper stage 81 is coupled via line 82 to the input of an electronic switch 83 whose two outputs 84 and 85 are connected respectively to peak-reading voltmeters 86 and 87.

Each peak-reading voltmeter may, according to a known construction, comprise two diodes and a condenser, elements 88, 89, and 90 for the voltmeter 86 and the elements 94, 95, and 96 for the voltmeter 87. The output of voltmeter 86 is applied, with the battery 91 in voltage opposition, to the D. C. amplifier 92. The output of this amplifier is connected to a servo-motor 25 and to a voltmeter 93 in parallel therewith. In similar fashion the voltmeter 87 is connected, with the battery 97 in voltage opposition, to the D. C. amplifier 98 whose output is connected to servo-motor 16 and voltmeter 99.

Each of the electronic switches 63, 73 and 83 comprises two pentode tubes. The two pentodes receive the signal to be switched on their control grids and have applied to their suppressor grids two rectangular voltages of opposite phases derived from the generator 106. The two output channels of each switch, indicated at 64 and 65 for switch 63, are connected to the plates of the pentodes of the switch. The switching signals produced by generator 106 have a recurrence rate equal to the frame scanning time or to a multiple thereof. To this end the frame synchronizing pulses from the generator 66 are applied as trigger pulses to the generator 106 via line 107.

The operation of the circuit just described is as follows:

During the occurrence of a switching signal of given polarity making the suppressors of tubes 100, 102, and 104 more positive than those of tubes 101, 103, and 105, the electronic switches transmit their input signals to the lines 64, 74 and 84. Under these conditions the target is scanned in horizontal lines, and in the course of one or more such lines there appears a video frequency pulse at the output of the image tube 4. A voltage proportional to the time interval between this video frequency pulse and the line synchronizing pulse immediately preceding it is indicated by the peak-reading voltmeter 86 to give an electric measure of the abscissa $ax'$ of the image $a$ with respect to the left edge of the target. This voltage is subtracted from the voltage of battery 91, which is selected to be proportional to the time required for the scanning beam to pass from the left edge of the target to the vertical passing through the center of the target. The difference between these voltages, which is applied to the input of amplifier 92, consequently represents the abscissa $ax$.

During the switching pulse of opposite polarity the electronic switches transmit the input signal applied thereto at lines 62, 72, and 82 to their output lines 65, 75, and 85. Under these conditions the target is scanned in vertical lines, in the course of one or more of which lines there appears at the output of the image tube a video frequency pulse. A voltage proportional to the time interval between this video frequency pulse and the line synchronizing pulse immediately preceding it is indicated at the peak-reading voltmeter 87. This voltage, when subtracted from the voltage of battery 97 representing the time required by the electron beam to pass from the upper edge of the target to the horizontal line passing through the middle of the target, gives a resulting voltage which is applied to the input of amplifier 98 and which represents the ordinate $ay$.

The voltmeters 93 and 99 therefore respectively measure the abscissa and the ordinate of the electronic image $a$. Moreover, the abscissa of $a$ is equal to the projection of the angle (assumed to be small) between the axis 3 of the instrument and the true line of sight to the object A, projected onto the plane containing the axis 3 and the horizontal axis of rotation of the telescope, multiplied by the focal distance of the telescope and the magnification factor of the image tube. Similarly the ordinate of $a$ is equal to the projection of the angle (assumed small) between the axis 3 and the true line of sight to the object A, projected onto the plane containing the axis 3 and the vertical axis of rotation of the telescope, multiplied by the focal distances of the telescope and the magnification factor of the image tube. It is therefore possible to calibrate the voltmeters 93 and 99 directly in multiples of 10 seconds of arc so that they will indicate respectively the values which must be added to the azimuth and elevation angles of the axis 3 (read at 31, 310 and 30, 300) in order to obtain the elevation and the azimuth of the true line of sight to the object A.

If it is desired to transmit the elevation and azimuth angles of the true line of sight the deviation voltages of meters 93 and 99 may be respectively added algebraically, after appropriate reduction in scale, to the voltages of voltmeters 31 and 310, and to the voltages of voltmeters 30 and 300.

For measurement of the abscissa of the electronic image on the target of the image tube it is possible, instead of generating a voltage proportional to $x'a$, to count the number of vertical scanning lines 55 lying to the left of the image $a$ of Fig. 3. Similarly, for measurement of the ordinate it is possible to count the number of horizontal lines 54 above the image $a$. Thereafter a transformation of coordinates is effected in order to relate the abscissa to the axis YY' of Fig. 3 and the ordinate to the axis XX'.

Figure 6:
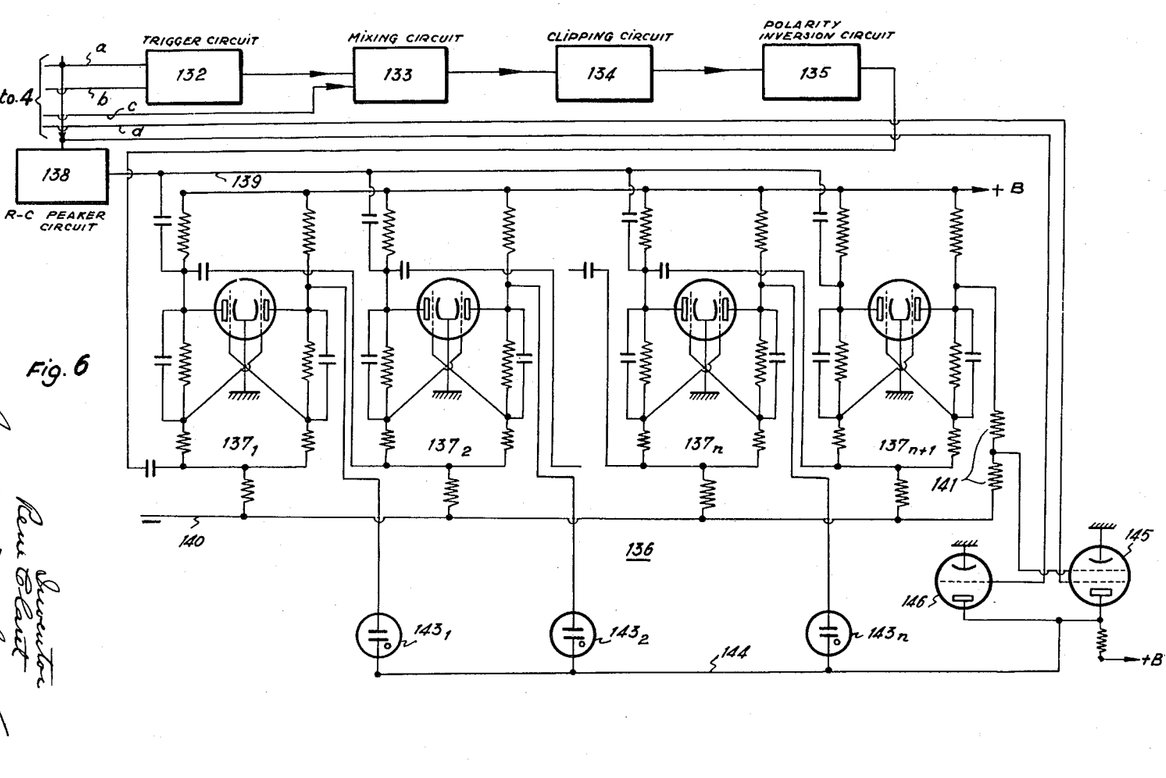
Fig. 6 is a schematic diagram of a modified electron tube circuit associable with the image tube 4 for counting by discrete increments the coordinates of the electron image.

Fig. 6 represents a counting circuit for counting the discrete increments of the abscissa $xa$ as determined by the vertical scanning lines.

The circuit of Fig. 6 makes use of the line and frame pulse generators 56 and 66, of the switching pulse generator 106, and the image tube 4, amplifier 78 and clipper 79 of Fig. 4, but is to be used as an alternative or replacement for the voltmeters 93 and 99 of Fig. 4.

The switching pulse 147 (Fig. 7) taken from the line $a$ (Fig. 4) which is connected to line 130, and the video frequency pulse 113 (from line $b$, Fig. 4) are applied to a trigger circuit 132 (Fig. 6) having two stable positions of equilibrium. Circuit 132 produces a pulse 149 (waveform $d$, Fig. 7) whose leading edge 150 coincides with the leading edge 151 of the switch pulse 147 and whose trailing edge 152 coincides with the pulse 113. The pulse 149 has a length equal to the interval separating the beginning of the switching pulse 147 from the video pulse 113. Its length is therefore proportional to the abscissa $x'a$.

Figure 7:
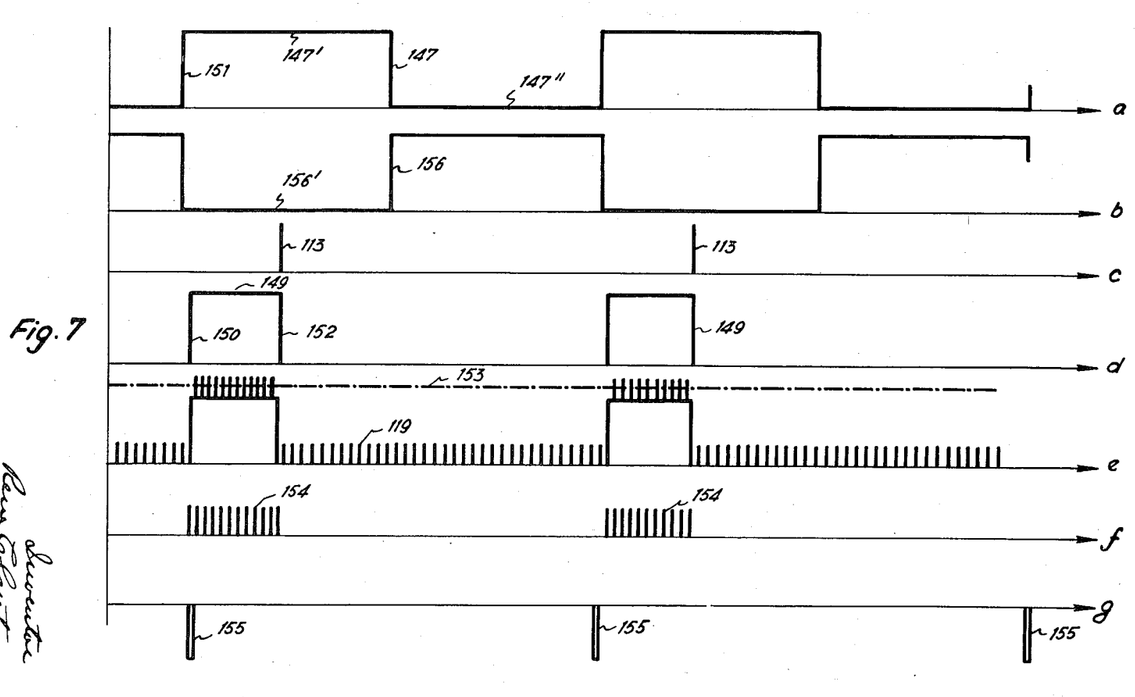
Fig. 7 is an idealized representation of the wave forms of certain signals present in the circuit of Fig. 6.

The pulse 149 from circuit 132 and the line pulses 119, which are available on the line $c$ (Figs. 4 and 6) are added in a mixing circuit 133 and the resulting signal (waveform $e$, Fig. 7) is clipped at the level 153 in a clipping circuit 134 to provide a signal as shown in waveform $f$ of Fig. 7. At the output of circuit 134 there appear pulses 154 (waveform $f$, Fig. 7) whose number is equal to the number of lines 55 to the left of the image $a$.

The polarity of the pulses 154 is made negative in the polarity inversion circuit 135 and the pulses so inverted are applied to a pulse counter 136.

The counter 136 includes a number $n+1$ of trigger circuits, the first $n$ of which, denoted $137_1 \ldots 137_2 \ldots 137_n$, form a first complex adapted to count and record the absolute value of the abscissa $xa$. The last trigger circuit $137_{n+1}$ forms by itself a second complex operating on the first to modify the recording of the abscissa according as the image $a$ is to the left or to the right of the vertical line YY' of the target shown in Fig. 3.

The trigger circuits $137_1, \ldots 137_n, 137_{n+1}$ are shown as conventional Eccles-Jordan circuits and make up a binary counter. These circuits are symmetrically energized on their grids by the negative polarity pulses 154 which are to be counted. They are moreover energized in parallel on the anodes of their left-hand sections as shown in Fig. 6, by negative pulses 155 (waveform g, Fig. 7) derived from the leading edge of pulses 147 (suitably inverted) having sufficient amplitude through the R-C peaker circuit 138. These negative pulses 155 restore the trigger circuits 137 to $137_{n+1}$, if displaced therefrom, to an equilibrium or "rest" condition in which their left-hand sections are nonconducting. Hereinafter a trigger circuit will be referred to as being in the "operating condition" when its right hand section is non-conducting and in its "rest condition" when the right hand section thereof is conducting.

There is connected a neon tube $143_1, \ldots 143_n$ between the plate of the right hand tube in each of the trigger circuits $137_1, \ldots 137_n$ and a line 144.

As will be explained below the voltage of the line 144 may assume three different values according to the condition of the trigger circuit $147_{n+1}$ and according as the switching signal 147 is instantaneously in its positive phase 147' or in its negative phase 147''. The positive phase may be referred to as the "counting phase" and the negative phase as the "recording phase." The breakdown voltage of the neon tubes will be assumed in the example now to be given as 75 volts.

The first value of voltage for line 144 is 300 volts (assumed by way of example as the first voltage) and occurs during the negative phase 147'' of the switching signal 147 destined for recording purposes and while the trigger circuit $137_{n+1}$ is at rest, i. e. when the image $a$ is to the left of line YY' of Fig. 3. When these conditions coexist each of the neon tubes $143_1 \ldots 143_n$ which is connected to a trigger circuit in operating condition has applied thereto zero volt. This is true because line 144 is at 300 volts and the upper terminal of each such neon tube is connected to the plate of a non-conducting trigger circuit tube, the plate supply of the trigger circuit tubes being assumed to be 300 volts also. Thus when line 144 is at its B+ voltage of 300 volts the neon tubes associated with trigger circuits in operating condition are dark.

The second voltage level for line 144 amounts to 210 volts and occurs during the negative phase 147'' destined for recording while the trigger circuit $137_{n+1}$ is in "operating" condition, i. e. when the image $a$ is to the right of the line YY' in Fig. 3. In this case each of the neon tubes $143_1, \ldots 143_{n+1}$ associated with a trigger circuit in operating condition is subjected to the voltage difference between 300 and 210 volts and is consequently lighted. A trigger circuit in energized condition therefore corresponds to a lighted neon tube.

The third value is equal to 250 volts and occurs during the phase 147' of the signal 147 destined to the counting function, regardless of the equilibrium position of the trigger circuit $137_{n+1}$. In this case each of the neon tubes corresponding to an energized trigger circuit carries the difference between 300 and 250 volts and is non-conducting, and each of the neon tubes corresponding to acquiescent trigger circuit carries the difference from 210 to 250 volts and is therefore similarly extinguished.

In consequence to the foregoing, during the portion 147' of the signal 147 reserved for the counting function all the neon tubes are extinguished, for it would be impossible, in view of their flashing, to read the number represented by these tubes. During the portion 147'' of signal 147 there corresponds to each trigger circuit in energized condition a de-energized neon tube, if the electron beam is to the left of the line YY', and a conducting neon tube if the beam is to the right of the line YY' in Fig. 3.

As an example of how the application during the recording phase of two different potentials to the line 144 makes possible a transformation of coordinates, let it be assumed that $n=6$ and that the neon tube $143_1$ corresponds to the zero binary order, that the tube $143_2$ corresponds to the binary order 1 and that the neon tube $143_6$ corresponds to the binary order 5. The vertical scan includes $2^{n+1}=128$ lines and the trigger circuit $137_7$ fires when the vertical line 55 passes through the point 0 (Fig. 3), sixty-four such lines 55 lying to the left of YY' and sixty-four lines lying to the right of YY'.

Consider two points $a$ and $a'$ symmetrically positioned with respect to the axis YY' (Fig. 3) and further so positioned that $$x'a=33$$
$$x'a'=95$$

Then $$xa=-31$$
$$xa'=+31$$

When the scanning beam passes over the image $a$ to the left of YY', the trigger circuits $137_1$ and $137_6$ are in operating condition and the trigger circuits $137_2$ to $137_5$ inclusive are at rest. Consequently, the neons $143_1$ and $143_6$ are extinguished and the neons $143_2$ to $143_5$ inclusive are lighted. If a dark neon represents the binary figure 1 and a lighted neon the binary figure 0, one may read the binary number 0 1 1 1 1 0 having a value in decimal notation of $30 \approx 31$.

When the beam passes over the image $a'$ to the right of YY', the trigger circuits $137_1$ to $137_7$ are in operating condition with the exception of circuit $137_6$ and, circuit $137_7$ being operated, the neons $143_1$ to $143_5$ are lighted and the neon $143_6$ is dark. Accordingly, one reads 1 0 0 0 0 0 in binary notation, having a decimal value of $32 \approx 31$.

A neon, not represented in Fig. 6, is connected between the anode of the right hand section of trigger circuit $137_7$ and a point having a potential of 300 volts. It is dark when trigger circuit $137_7$ is in operating condition, i. e. when the electronic image is on the right of line YY' and indicates that a sign plus is to be taken before the recorded abscissa. It is lighted when trigger circuit $137_7$ is at rest, i. e. when the electronic image is on the left of line YY' and indicates that a sign minus is to be taken before the recorded abscissa.

The change in potential of line 144 according to the position of circuit $137_{n+1}$ is achieved as follows:

Tube 145 has its plate connected to line 144 and its control grid to a suitable point on divider 141. The second grid receives the switching signal 156 (of opposite phase to signal 147) via line $d$ in Fig. 6, connecting to line 131 of Fig. 4. A further tube 146 is connected in parallel with tube 145 between line 144 and ground and has the switching signal 147 applied to its grid.

During the recording phase, if circuit $137_{n+1}$ is at rest, tube 146 is cut off by the negative portion 147'' of 147 and tube 145 is cut off on its control grid. Hence, line 144 is of B+, assumed to be 300 volts. If circuit $137_{n+1}$ is in operating condition, tube 145 conducts but tube 146 remains cut off by voltage 147''. Line 144 is therefore at an intermediate voltage level of 210 volts.

During the counting phase, tube 145 is cut off regardless of the condition of circuit $137_{n+1}$ since it receives on its second grid the negative portion 156' of the second switching signal 156 (line $d$, Fig. 6). At the same time however, tube 146 conducts since the positive portion 147' of signal 147 is applied to its grid. Tube 146 therefore constitutes a load across tube 145 bringing the voltage of line 144 to 250 volts.

The operation of the circuit of Fig. 6 has been explained in the case of $128=2^7$ scanning lines and of 7 counting circuits. In the general case, the relationship between the number of counting circuits and the number of lines in the scan should be N counting circuits for $2^N$ scanning lines; in these conditions, there are $2^{N-1}$ lines before line YY' and $2^{N-1}$ lines after and the Nth counting circuit starts in operation when the image is exactly on line YY'.

The circuit for determining the ordinate is the same as that of Fig. 6 except that leads $a$ and $d$ are interchanged.

As many changes could be made in the above construction and circuits and many apparently widely different embodiments of this invention could be made without departing from the scope thereof, it is intended that all matter contained in the above description or shown in the accompanying drawings shall be interpreted as illustrative and not in a limiting sense.

I claim:

1. An instrument for determining the azimuth and elevation angles of a light source with reference to an azimuth plane and a prime direction therein, said instrument comprising a base, an objective lens, an image iconoscope, said lens and iconoscope being mounted coaxially in fixed relative position with the lens at its focal distance from the photocathode of the iconoscope, a fork supporting said lens and iconoscope for rotation about an axis perpendicular to the axis of said lens, a bearing in said base supporting said fork for rotation about an axis perpendicular to the axis of rotation of said lens in said fork, first and second motors coupled respectively between the lens and iconoscope and the fork and between the fork and the base, separate means to measure the angular positions of the lens and iconoscope with respect to the fork and of the fork with respect to the base, a deflection generator and associated deflection circuits adapted to scan the mosaic target of said iconoscope in frames of horizontal and vertical lines, means to shift the line deflection output of said generator successively between the horizontal and vertical deflection circuits at frame frequency, a video amplifier coupled to the signal output terminal of the iconoscope, a mixing circuit receiving the line scanning voltages from said generator and the output of said amplifier, a clipper receiving the output of said mixing circuit, two peak-reading voltmeters, and electronic switch operating at frame frequency connected between the output of said clipper and said voltmeters, and means to couple said voltmeters to said motors whereby the voltmeter receiving the output of said clipper during scanning of said target in horizontal lines is coupled to the motor between said fork and base and the voltmeter receiving the output of said clipper during scanning of said mosaic target in vertical lines is coupled to the motor between said lens and fork.

2. Apparatus for determining the azimuth and elevation angles of a light source comprising a base, an objective lens and image iconoscope supported rigidly together with the photocathode of the iconoscope substantially perpendicular to the axis of the lens and spaced from the lens by the focal distance of the lens, support means supporting said lens and iconoscope for rotation together about a first axis of rotation, means in said base supporting said support means for rotation about a second axis of rotation perpendicular to the first, first and second motors coupled respectively between said lens and iconoscope and said support means and between said support means and said base, first and second indicating means adapted respectively to indicate the angular position of said lens and iconoscope about said first axis and of said support means about said second axis, a deflection generator and horizontal and vertical deflection circuits for said iconoscope, said deflection generator including circuits for developing line and frame synchronizing and scanning voltages, a square wave voltage generator having a repetition frequency equal to twice the frame frequency of the deflection generator and synchronized thereby, a trigger circuit receiving as inputs the output of said square wave generator and the output of the signal electrode of the iconoscope, means to add to the output of said trigger circuit the line synchronizing pulses from the deflection generator, and a binary counter including one Eccles-Jordan trigger circuit for each order in the binary number of lines in one frame of the deflection generator, and means to apply the output of said adding means to said counter.

References Cited in the file of this patent

UNITED STATES PATENTS

| | | |
|---|---|---|
| 2,077,398 | Clark | Apr. 20, 1937 |
| 2,403,975 | Graham | July 16, 1946 |
| 2,412,612 | Godet | Dec. 17, 1946 |
| 2,444,933 | Jasperson | July 13, 1948 |
| 2,492,148 | Herbold | Dec. 27, 1949 |
| 2,532,063 | Herbst | Nov. 28, 1950 |
| 2,581,589 | Herbst | Jan. 8, 1952 |
| 2,603,123 | Loukomsky et al. | July 15, 1952 |